US008824311B2

(12) United States Patent
Beaudin

(10) Patent No.: US 8,824,311 B2
(45) Date of Patent: Sep. 2, 2014

(54) SYSTEM AND METHOD FOR CO-CHANNEL INTERFERENCE MEASUREMENT AND MANAGED ADAPTIVE RESOURCE ALLOCATION FOR WIRELESS BACKHAUL

(75) Inventor: Steve Andre Beaudin, Ottawa (CA)

(73) Assignee: Blinq Wireless Inc., Ottawa, Ontario (CA)

( * ) Notice: Subject to any disclaimer, the term of this patent is extended or adjusted under 35 U.S.C. 154(b) by 325 days.

(21) Appl. No.: 13/230,368

(22) Filed: Sep. 12, 2011

(65) Prior Publication Data

US 2012/0236731 A1   Sep. 20, 2012

Related U.S. Application Data

(60) Provisional application No. 61/382,217, filed on Sep. 13, 2010.

(51) Int. Cl.
*H04W 72/08* (2009.01)
*H04B 17/00* (2006.01)
*H04W 92/12* (2009.01)

(52) U.S. Cl.
CPC ......... *H04W 72/082* (2013.01); *H04B 17/0077* (2013.01); *H04W 92/12* (2013.01); *H04B 17/005* (2013.01)
USPC ........................... 370/248; 370/254; 370/330

(58) Field of Classification Search
USPC ......... 370/341, 330, 329, 260, 248; 455/63.1, 455/453, 450
See application file for complete search history.

(56) References Cited

U.S. PATENT DOCUMENTS

| | | | | |
|---|---|---|---|---|
| 5,956,642 | A  * | 9/1999 | Larsson et al. | 455/449 |
| 7,826,417 | B2 * | 11/2010 | Yang et al. | 370/329 |
| 2004/0087327 | A1* | 5/2004 | Guo | 455/522 |
| 2012/0140642 | A1* | 6/2012 | Beck et al. | 370/252 |

FOREIGN PATENT DOCUMENTS

WO   WO 9631009 A1 * 10/1996 ............. H04B 1/034

* cited by examiner

*Primary Examiner* — Donald Mills
*Assistant Examiner* — Henry Baron
(74) *Attorney, Agent, or Firm* — Ridout & Maybee LLP; Angela de Wilton

(57) ABSTRACT

A system, method, and software are provided for measuring co-channel interference comprising interlink interference in a wireless backhaul network with particular application for management of resource allocation for Non Line of Sight (NLOS) wireless backhaul in MicroCell and PicoCell networks. Given the difficulty of predicting the interlink interference between multiple links, DownLink and UpLink co-channel interference are characterized for each backhaul radio link between each Hub and each Remote Backhaul Module Unit periodically during active service. Beneficially, the co-channel interference metrics are used as the basis for intelligently and adaptively managing network resources to substantially reduce cumulative interference and increase the aggregate data capacity of the network e.g. by grouping of interfering and/or non-interfering links, and managing resource block allocations accordingly, i.e. assigning common resource blocks preferentially to weakly interfering links or groups of links and allocating a different resource block or orthogonal channels to each strongly interfering link or groups of links.

23 Claims, 7 Drawing Sheets

|  | $Hub_{01}$ | $Hub_{02}$ | ......... | ......... | $Hub_{n-1}$ | $Hub_n$ |
|---|---|---|---|---|---|---|
| $RBM_1$ | 0 | -44 | ... | ... | -60 | -41 |
| $RBM_2$ | -3 | -32 | ... | ... | -52 | -39 |
| $RBM_3$ | -7 | -67 | ... | ... | -26 | -28 |
| ... | ... | ... | ... | ... | ... | ... |
| ... | ... | ... | ... | ... | ... | ... |
| $RBM_{m-1}$ | -42 | 0 | ... | ... | -35 | -49 |
| $RBM_m$ | -54 | -9 | ... | ... | -37 | -36 |

Figure 6

SYSTEM AND METHOD FOR CO-CHANNEL INTERFERENCE MEASUREMENT AND MANAGED ADAPTIVE RESOURCE ALLOCATION FOR WIRELESS BACKHAUL

CROSS-REFERENCE TO RELATED APPLICATION

This application claims priority from U.S. Provisional Application No. 61/382,217, filed 13 Sep. 2010, entitled "System and Method for Co-Channel Interference Measurement and Managed Adaptive Resource Allocation for Wireless Backhaul", which is incorporated herein by reference.

TECHNICAL FIELD

This invention relates to wide area wireless data networks, wireless backhaul for high capacity data networks, and to systems and methods for measuring co-channel interference, with particular application to management of resource allocation for Non Line of Sight (NLOS) wireless backhaul in MicroCell and PicoCell networks.

BACKGROUND

Operators of wireless networks face a number of challenges in cost-effectively deploying networks resources to meet recent dramatic increases in the demand for total data capacity. This demand is being driven by the introduction of data intensive applications for smart phones, and new mobile devices with video capabilities, which in turn drive the introduction of additional data intensive applications. For example, in 2009, introduction of the iPhone® by one operator in the United States resulted in a sudden massive increase in the total traffic volume, with resultant stress on their network resources to provide the required cell site capacity to satisfy increased user demand. Other operators are seeing similar trends as they follow suit. Although cell splitting, with deployment of small cells, is an attractive option to increasing capacity, existing high capacity backhaul solutions, which depend on fibre and microwave, are costly to implement.

Operators have limited options to meet the increasing capacity demand with existing network technologies. If they have unused spectrum, the easiest method is to add carriers to increase the total RF bandwidth and hence the aggregate capacity of their cell sites. In many cases this can be cost effective. If they have deployed multi-carrier radios then increasing the carrier count does not require additional radios or antennas to be deployed. The disadvantage is that the additional carriers do not increase the Uplink speed since this is effectively limited by the path loss of the large cell and the limited energy per bit which a user terminal can generate.

Another option is to migrate to more spectrally efficient technologies, i.e. migration from current 3G technologies (e.g. based on CDMA and UMTS) towards next generation 4G technologies. Currently, the 3GPP LTE (Long Term Evolution) standard, which is based on MIMO/OFDMA (Multiple Input Multiple Output/Orthogonal Frequency Division Multiple Access), has emerged as the technology of choice and many operators are planning their migration from CDMA or UMTS to LTE over the next few years. Although the LTE technology is based on OFDM/MIMO, the uplink performance at the cell edge is not greatly increased, since this is still limited by the energy/bit that is required to compensate for the large path loss and the limited power which a UE (User Equipment) transmitter is able to generate.

Moreover, as operators roll out 4G networks, they are faced with a delicate balancing act. They must invest heavily in infrastructure for a new air interface knowing that the initial subscriber density will be very low and their investment will not create significant amounts of revenue for several years. Most operators would expect their 4G investments to generate a net loss until a minimum subscriber density is achieved. To minimize the impact, an operator would likely choose to implement 4G in dense urban centers initially knowing that they will achieve a critical subscriber density relatively fast, and as these sites become profitable they would extend the coverage to increasingly less populated, less profitable areas. Although such a cautious deployment method makes sense, inter-operator competition for footprint may force operators to be more aggressive, take more risk, and deploy 4G aggressively in an effort to gain market share.

Cell splitting to increase the frequency reuse is a more powerful method and is an option even if an operator has used its entire available spectrum. The total aggregate capacity of the network increases in proportion to the number of cells. Furthermore, the user experience improves greatly since the smaller cell radius and lower propagation loss between the UE and BTS (Base Transceiver Station) means that the terminal needs to send less energy/bit and as a result can transmit over a larger bandwidth. Also, higher order modulations can be used given that a stronger signal results in a better Signal to Noise Ratio (SNR), which results in a more spectrally efficient communication link. For a fairly dense sub-urban neighbourhood the path loss exponents can be in the range of 3.5 to 4, which is to say that the path loss increases to the 4th power of the distance. So, to maintain a certain SNR at the receiver, if the distance reduces by half, the transmitter would only need to transmit $(\frac{1}{2})^4 = \frac{1}{16}$. Alternatively, for a given UE transmit power, the UE would now be able to transmit 16 times more bandwidth for a given desired SNR at the opposing receiver, which is a tremendous improvement in uplink performance.

Given that Cell splitting increases both the aggregate network capacity, and the achievable uplink and downlink data rates, this option offers a very attractive deployment scenario for both existing 3G networks and the emerging 4G. LTE and WiMax networks and is expected to be a primary focus of wireless operators over the coming decade. This trend is also giving rise to a large demand for smaller lower power cell sites, which are typically referred to as Pico or Micro Cells, compared to the larger higher power macro cell base stations.

Two key challenges of cell splitting are site acquisition and backhaul.

Considering site acquisition, for macro-cells, the ability to cell split is restricted by the number of available towers or high-rise buildings. Furthermore, the current lease rates on a tower or high-rise building can easily run at $2k per month or $24k per year in developed economies. As an operator cell splits, the number of cell lease agreements and his resultant operational expenses (OPEX) fees increase proportionally. Furthermore, zoning laws may restrict the ability to build new towers and in some jurisdictions, even if they allow a new tower to be built, obtaining a permit can take several years.

PicoCells offer a potential way around the site acquisition issue. As the power of the BTS and the cell radius decrease into the MicroCell or PicoCell range, the BTS can be deployed at lower elevations, for example on a utility pole. In the United States, the FCC has mandated that wireless operators must be given access to utility poles at a predetermined rate, to facilitate this industry trend.

With respect to backhaul challenges, a 4G cell site must support data rates which will peak in the range of 100 Mbps with average data rates perhaps in the range of 10 Mbps. Peak data rates of 100 Mbps are currently only supported by fiber or by Microwave radio links. High capacity fiber links are available on major high-rise buildings and on many cellular towers, but they are not available for the vast majority of utility poles where an operator may wish to deploy a PicoCell. Furthermore, to enable support for the peak data rates that a 4G cell site will be able to generate will require the operator to equip each PicoCell with a link capable of supporting a similar backhaul speed. Today, a 100BaseT Ethernet link can cost upwards of $1500/month in the US and Canada, which results in very significant OPEX costs ($18K/year). If an operator decided to reduce on backhaul costs by equipping his PicoCells with DSL or Cable Modems, then the Peak data rates that can be supported will be greatly diminished and the user experience and the operator's competitive position is reduced.

Microwave radio is a cost effective means of providing a high capacity backhaul connection. A typical Microwave radio link can be installed for a one time cost of approximately $10K and recurring OPEX fee of about $2K/link/year to the owner of the spectrum. Microwave radios can be deployed to provide a high capacity backhaul link from the BTS to an aggregation point where a high capacity fiber link is available. Given that a GigE link is only marginally more expensive than a 100BT link, the ability to aggregate traffic to a common location provides significant saves. This is considerably cheaper than leasing a 100BT fiber link for each BTS. The complication is that Microwave Radio operates at higher frequencies and as a result is restricted to Line of Sight (LOS) type deployments. This is not a major impediment for establishing a link between two elevated sites, which are substantially above the clutter, but it is no longer an option when the PicoCells or Microcells are deployed on lower elevation structures, below clutter, and LOS conditions no longer exist between the PicoCell and a desired aggregation point.

Thus, although cell splitting, with deployment of Microcells and PicoCells, offers advantages in increasing cell site capacity, current LOS solutions for wireless backhaul require that cell sites and aggregation points (BTS) are elevated, above the clutter. Thus backhaul remains a bottleneck for 4G, and to some extent, 3G networks. Thus it would be desirable to provide a NLOS backhaul solution, which would be capable of providing cost effective, high capacity connection/link from a Base Station (MicroCell or PicoCell) to a common aggregation point. On the other hand, there are a number of other challenges that arise in implementing a NLOS solution.

LOS Microwave antenna can be highly directional, reducing the probability of co-channel interference to a low value. NLOS Radio Links operate at lower frequencies than LOS Microwave Radio Links, and a larger path loss is expected for a given propagation distance because the signal must travel through obstructions such as buildings, trees, or around small hills. Reduced directionality, the random nature of obstructions, fluctuating path losses and beam spreading increase the probability of co-channel interference. Effective deployment of NLOS backhaul solutions therefore requires control of Carrier to Interference and Noise Ratio (CINR).

A method for characterization of co-channel interference is disclosed in PCT International Patent Publication No. WO 2008/096383, and related US Patent Applications Nos. US2010/009748 and US2010/0159841, to Barberis et al., entitled "Characterization of co-channel interference in a wireless communications system, in particular a cellular radio communication system". These applications are more particularly directed to characterization of interference experienced by a NodeB transceiver station interfered with by a large number of interfering UEs, using a vector quantization method and codebook in which UEs periodically send feedback messages with attenuation information to a serving NodeB transceiver.

For wireless backhaul networks, and particularly NLOS wireless networks, there is a need for methods for characterization of co-channel interference, for both uplink and downlink, which address issues of measurement accuracy over a large dynamic range, and channel reciprocity, for example, and/or to provide solutions for effectively controlling CINR in NLOS backhaul networks.

An object of the present invention is to provide a wireless backhaul solution which addresses at least some of the above-mentioned issues in implementing cell splitting, particularly for deployment of MicroCells and PicoCells for wireless backhaul.

SUMMARY OF INVENTION

The present invention seeks to eliminate, or at least mitigate one or more disadvantages of these known systems and methods, or at least provide an alternative.

Thus, aspects of the present invention provide a system and method for measurement of co-channel interference and also provides systems and methods for managed adaptive resource allocation (MARA) for wireless backhaul based on measurement of co-channel interference, to enable reduced co-channel interference and for increased aggregate data capacity, with particular application to NLOS wireless backhaul. Also provided are computer program products for implementing these methods.

More particularly, a system and method is provided for measuring co-channel interference, comprising mutual interference or interlink interference, in a backhaul wireless network with particular application for management of resource allocation for Non Line of Sight (NLOS) wireless backhaul in MicroCell and PicoCell networks. Given the difficulty of predicting the mutual interference between multiple links, DownLink and UpLink co-channel interference comprising said interlink interference is characterized between each Hub and each Remote Backhaul Module Unit periodically during active service. Beneficially, the co-channel interference metrics are used as the basis for intelligently and adaptively managing network resources to substantially reduce interference and/or increase the aggregate data capacity of the network e.g. by grouping of interfering and/or non-interfering links, and managing resource block allocations accordingly, i.e. assigning common resource blocks to weakly interfering links or groups of links, and allocating different resource blocks or orthogonal channels to strongly interfering links or groups of links.

According to one aspect of the present invention, there is provided a method for managing resource allocation for a plurality of backhaul radio links in a wireless backhaul network comprising a plurality of stationary nodes, each comprising a transmitter, receiver and directional antenna, the method comprising the steps of: measuring periodically, at each node, co-channel interference comprising interlink interference from each of the other nodes of the backhaul network, comprising: transmitting, from each node in turn, a signal and measuring a respective received signal at each of the other nodes of the backhaul network to provide measured data, comprising at least one of relative path loss and signal strength, indicative of interlink interference, for each of the plurality of backhaul radio links; determining from said measured data the magnitude of interlink interference for each of the plurality of backhaul radio links and identifying one or more most strongly interfering links of the plurality of backhaul radio links; and scheduling resources comprising allocating a different resource block to each of the one or more most strongly interfering links to provide at least one of reduced cumulative interference and increased aggregate capacity of the plurality of backhaul radio links.

Preferably, the method further comprises determining from said measured data the magnitude of interlink interference for each of the plurality of radio links; organizing links based on their magnitude of co-channel interference and scheduling resources blocks to links based on said organization of links.

For example, each node comprises a Hub having a high capacity backhaul connection and at least one Remote Backhaul Module, and each of the plurality of radio links provides wireless backhaul connectivity between a respective Hub and a remote base station, and the method may comprise determining from said measured data the magnitude of interlink interference for each of the plurality of radio links between each Hub and each Remote Backhaul Module.

Preferably, the step of organizing comprises grouping links based on the magnitude of interlink interference, and scheduling resources comprises allocating resource blocks based on said grouping of links. Links may be grouped based on the magnitude of interlink interference, comprising identifying a group of links with low interference below a predetermined threshold. Resource scheduling may comprise allocating common resource blocks only to said group of links with low interference, or allocating common resource blocks preferentially to said group of links with low interference. Links may be grouped based on the magnitude of interlink interference comprising of identifying a group of most strongly interfering links, and scheduling resources by allocating different resource blocks to each link of said group of most strongly interfering links, i.e. to increase CINR.

For example, grouping links based on the magnitude of interlink interference comprises: identifying a group of the most strongly interfering links; or links that have an interference level above or below a threshold level; or links that collectively have an interference level above or below a threshold level; or a group of weakly interfering links. Scheduling resources may comprise assigning common resource blocks preferentially to weakly interfering links or groups of links; and/or allocating different resource blocks or orthogonal channels to strongly interfering links or groups of links, except when a node is requested to operate at maximum capacity.

Advantageously, the method may comprise identifying, from the measured data, one or more most strongly interfering links, and in scheduling resources, preferentially allocating different resource blocks or orthogonal channels to each of the one or more most strongly interfering links, e.g. to increase CINR sufficiently to allow for high performance modulation.

More particularly, measuring relative path loss may comprise using a predetermined resource block, e.g. within an OFDM frame, to measure the relative path loss between multiple radio transmitters and multiple radio receivers. The predetermined resource block is reserved across multiple nodes, e.g. across an entire WAN or MAN, to provide for improved dynamic range of the measurement. The method may comprise transmitting a predetermined symbol or symbols, or a group of symbols, from each node in a known sequence such that the relative path loss can be determined between each transmitter and multiple receivers in sequence.

Measurements of the relative signal strength of the predetermined symbol, symbols or groups of symbols may be shared amongst all receiving nodes such that an aggregate view of the mutual interference (co-channel interference) is known by all nodes. For example, this step may comprise generating a matrix (MARA matrix) comprising the magnitude of co-channel interference for each link, and distributing said matrix to each node or a central node.

The method may comprise power boosting the predetermined symbol or symbols to allow distant nodes to receive the predetermined symbol above a noise floor or interference floor.

A predetermined group of symbols may be transmitted in a known sequence in order to provide sufficient processing gain at the receiving node and allow the magnitude of the predetermined group of symbols to be measured in the presence of interference or noise.

The radio links may be used to provide NLOS wireless backhaul connectivity between a Hub with a high capacity backhaul connection and remote base stations (RBS). The method may comprise determining the magnitude of interlink interference at periodic intervals during active service of the backhaul network.

Also provided is a system for implementing steps of the above-described method.

Thus, a second aspect of the invention provides a system for managing resource allocations for a of plurality radio links in a wireless backhaul network, particularly a wide area wireless backhaul network, comprising a plurality of nodes, each comprising a transmitter and receiver and directional antenna, the system comprising: processor means for measuring periodically, at each node, co-channel interference comprising interlink interference from each of the other nodes of the backhaul network by steps comprising: transmitting, from each node in turn, a signal and measuring a respective received signal at each other node of the plurality of nodes to provide measured data comprising at least one of relative path loss and signal strength, indicative of interlink interference; determining from said measured data the magnitude of interlink interference for each of the plurality of backhaul radio links and identifying one or more most strongly interfering links of the plurality of backhaul radio links; and scheduler means for scheduling resources based on said measured data comprising allocating a different resource block to each of the one or more most strongly interfering links to provide at least one of reduced cumulative interference and increased aggregate capacity of the plurality of backhaul radio links.

In a preferred embodiment, the processor means, may comprise hardware and/or software, and is operable for determining from said measured data the magnitude of interlink interference for each of the plurality of radio links; and comprises organizing means for organizing (e.g. grouping or ranking) links based on their magnitude of interlink interference, and the scheduler means is operable for scheduling resources blocks to links based on said organization of links.

For example, each node may comprise a hub with a high capacity backhaul connection and/or at least one Remote Backhaul Module, each radio link provides wireless backhaul connectivity between a hub and a remote base station, and the processor means provides for determining from said co-channel interference data the magnitude of interlink interference for each of the plurality of radio links between each Hub and each Remote Backhaul Module.

Another aspect of the invention provides a method for characterizing co-channel interference between a plurality of radio links in a wireless network, e.g. a wide area wireless backhaul network, comprising a plurality of nodes, each node comprising a transmitter and a receiver and directional antenna, comprising: measuring periodically, at each node, co-channel interference comprising interlink interference from each of the other nodes of the backhaul network comprising: measuring the relative path loss or signal strength for each of a plurality of radio links comprising reserving a predetermined resource block across multiple nodes, using said predetermined resource block to obtain measurements of the relative path loss or signal strength for each of the plurality of backhaul radio links between said multiple nodes, determining from said measurements a cumulative interference for said plurality of backhaul radio links, and identifying one or more most strongly interfering links of said plurality of backhaul radio links causing the cumulative interference to exceed a threshold cumulative interference.

A predetermined resource block, e.g. within an OFDM frame, is used to measure the relative path loss or signal strength between multiple radio transmitters and multiple radio receivers. Preferably, the predetermined resource block is reserved across multiple nodes, e.g. across an entire WAN or MAN, to provide for improved dynamic range of the measurement.

Measuring relative path loss or signal strength comprises transmitting at least one predetermined symbol from each node in a known sequence such that the relative path loss can be determined between each transmitter and multiple receivers in sequence. Measurements of the relative signal strength of a predetermined symbol may be shared amongst all receiving nodes such that an aggregate view of the mutual interference, or co-channel interference, of each node is known by other nodes. This step may comprise generating a matrix (MARA matrix) comprising the magnitude of co-channel interference, comprising interlink interference for each link, and distributing said matrix to a central node or to each node. The resulting co-channel interference metrics, may be used for managed adaptive resource allocation as described herein, e.g. to increase capacity or CINR.

During transmission of the at least one predetermined symbol to a receiving node, the method may comprise ceasing transmission from the transmitter of the receiving node for said at least one symbol, during which a weak signal from the transmitting node can be received. The transmitting nodes may power boost the predetermined symbol to allow distant nodes to receive the predetermined symbol above a noise floor or interference floor. The method may comprise transmitting a predetermined group of symbols in a known sequence in order to provide sufficient processing gain at the receiving node and allow the magnitude of the predetermined group of symbols to be measured in the presence of interference or noise. Preferably, the method includes both power boosting and processing gain to provide for measurements over a larger dynamic range.

Other aspects of the invention provide software, or a computer program product stored in a computer readable transmission or storage medium, for example, for performing the method steps as described above, e.g. in a system as described herein, to measure co-channel interference metrics and to provide for managed adaptive resource allocation, with particular application to reducing interference or increasing aggregate cell capacity in a NLOS wireless backhaul network.

The foregoing and other objects, features, aspects and advantages of the present invention will become more apparent from the following detailed description, taken in conjunction with the accompanying drawings, of preferred embodiments of the invention, which description is by way of example only.

BRIEF DESCRIPTION OF DRAWINGS

In the drawings, identical or corresponding elements in the different Figures have the same reference numeral.

FIG. 6 represents a matrix (MARA Matrix) displaying the magnitude of interference received or created between every Hub and every Remote Backhaul Module in the managed network; every column lists the relative interference that a given Hub receives from all the Remote Backhaul Modules within the zone of interest; every row lists the relative interference level that a given Remote Backhaul Module receives from each Hub in the managed zone.

DESCRIPTION OF PREFERRED EMBODIMENTS

Figure 1:
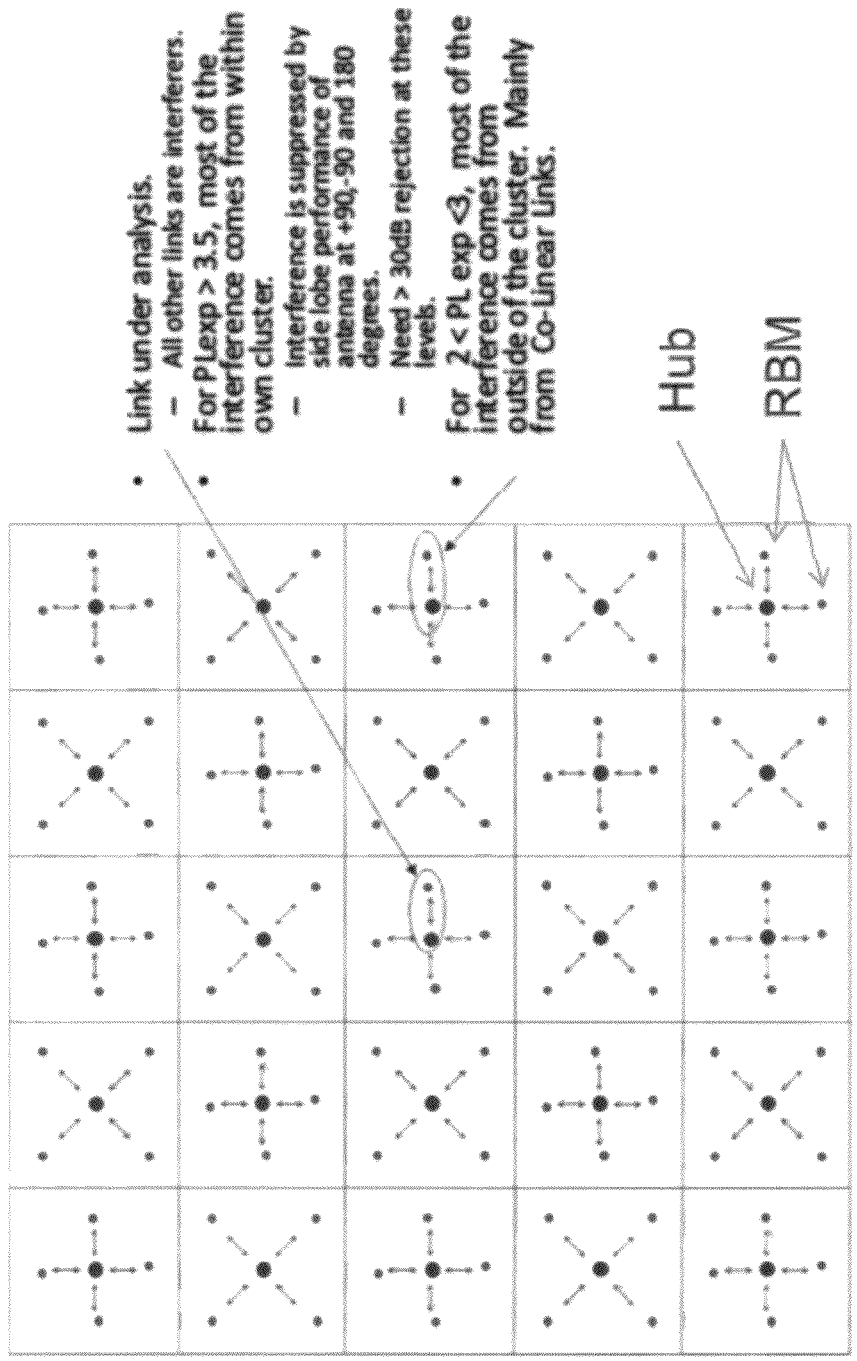
FIG. 1 shows a schematic diagram representing an arrangement of an exemplary wireless network comprising several clusters of Hubs and Remote Backhaul Modules arranged in a grid, the larger [blue] dots represent Hubs, while the smaller [red] dots represent remote backhaul modules.

FIG. 1 illustrates schematically a wide area wireless backhaul communications network comprising a plurality of nodes (N), each comprising a cluster of a Hub (H) and associated Remote Backhaul Modules (RBM), arranged in a grid, which will be used to illustrate systems and methods, according to embodiments of the present invention, for measurement of co-channel interference, control of CINR, and managed adaptive resource allocation. In particular, a novel NLOS backhaul solution is presented, which is capable of providing a cost effective, high capacity, backhaul connection from a Base Station (e.g. a MicroCell or PicoCell) to a common aggregation point.

As represented in FIG. 1, each cell of the grid comprises a cluster of a hub (H) and a number of Remote Backhaul Modules (RBM). The larger, blue dots represent Hubs while the smaller red dots represent remote backhaul modules. In this example, a cluster comprises one Hub and 4 remote backhaul modules. In a real deployment, the placement of the individual nodes in the grid will vary in a random fashion. Some clusters may comprise a single Hub and Remote Backhaul module while other clusters may comprise a few Hub modules on a single tower or building communicating with potentially a large number of Remote Backhaul modules. Each Hub has a high capacity backhaul connection to the core network, preferably a LOS microwave link. Typically, each Remote Backhaul Module is located in a PicoCell or MicroCell.

The placement of the actual modules depends largely on the availability of elevated structures such as buildings, towers or utility poles and the need to provide an access node in a specific location.

Figure 7:
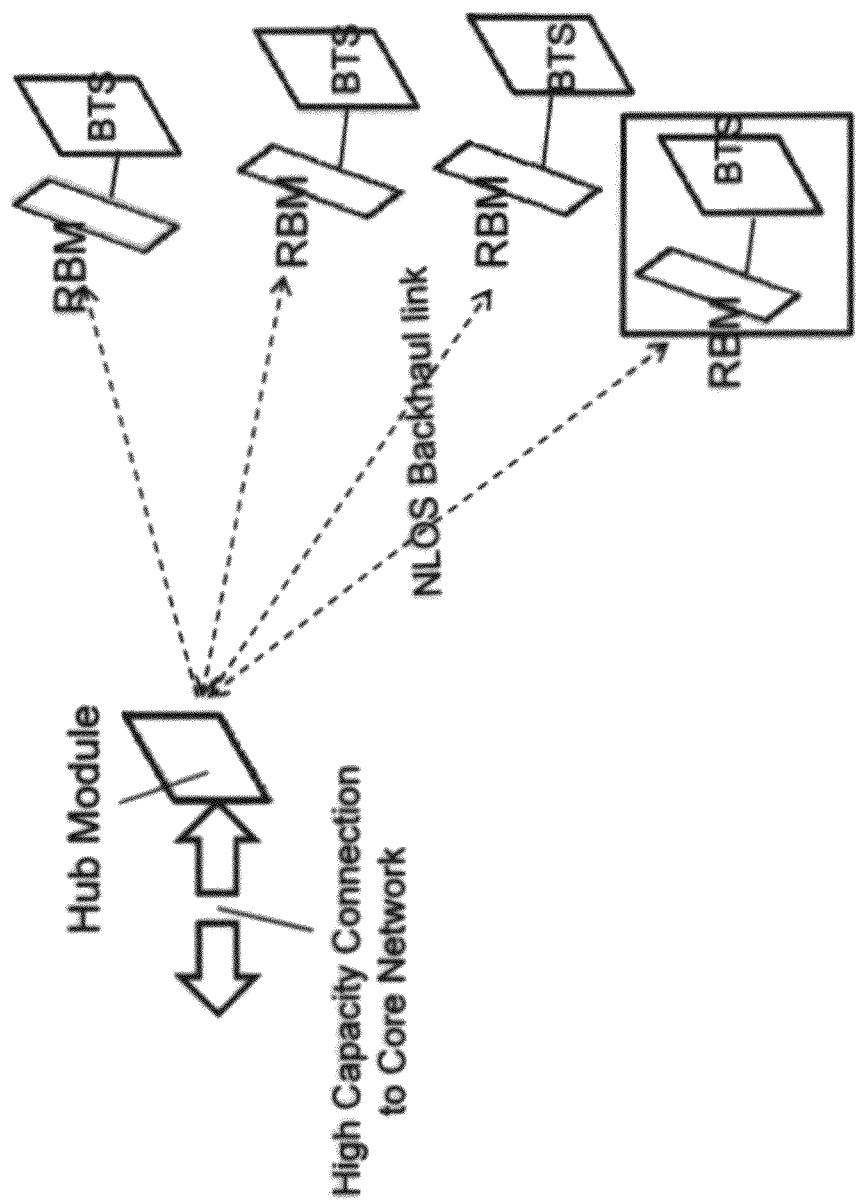
FIG. 7 illustrates schematically part of a network for providing a NLOS wireless backhaul link between a Hub module and four Remote Backhaul Modules, each linked to respective compact BTS.

As shown schematically in FIG. 7, for example, each Hub serves multiple BTS via respective Remote Backhaul Modules (RBM). Each RBM may be separate unit with a wired connection to a BTS, or the RBM may be a module that comprises part of a BTS system. The Hub module may be deployed at a relatively high elevation for a LOS Microwave backhaul connection, while the RBMs may be mounted lower, e.g. on a utility pole along with a compact BTS, to provide NLOS wireless backhaul connectivity to the respective Hub.

In particular, the NLOS backhaul link provides for a high capacity link from a BTS which can be below clutter, and as a result can be deployed on a utility pole or another elevated structure, back to a common aggregation point such as an existing cellular tower where a high capacity fiber link such as 100BT, GigE, OC48 or OC192 are available. An important difference from LOS microwave backhaul systems is that the BTS does not need to be above clutter, which would be an essential requirement to implement a LOS radio link. Such a deployment model mitigates both the backhaul challenge as well as the site availability issues and provides an operator with a very high capacity network and much improved Down-Link and Uplink speeds for the end user.

As mentioned above, there are several fundamental differences between a LOS Microwave Radio link and a NLOS Radio Link. In general, LOS radio links will operate at higher frequencies where large amounts of spectrum are available. To operate in a NLOS environment, and at a given frequency, larger path loss can be expected for a given propagation distance given that the signal must travel through obstructions such as buildings and trees and potentially around small hills. In general, for a LOS radio link the path loss exponent is about 2, which corresponds to a lossless propagation medium where the area of the wave front expands with the square of the distance traveled. For Non Line of Sight (NLOS) radio links the path loss exponent is greater and depends on the type of terrain through which the signal travels. It can typically vary from 2.5 for a flat rural terrain with few trees to 3.5 or 4 for a more dense sub-urban deployment to as high as 6 inside a building with many walls and obstructions.

There are several propagation models that aim to predict the path loss of a radio signal through a NLOS environment. Three of the more prevalent models are the Stanford University Interim (SUI) model, the COST-231 Hata Model and the ECC-33 model. The propagation models are empirical equations which approximate the mean path loss which can be expected as a function of distance, for a given terrain type. They are generally based on field studies.

Furthermore, given that the terrain through which the radio link propagates varies, even for equal distance point we can expect to measure a range of path losses. This random effect is accounted for by using a shadowing parameter, which is typically referred to as Log Normal Shadowing, since the distribution of path losses has a normal distribution on a logarithm scale. Typical values for the standard distribution of the Log Normal Shadowing are about 9 dB.

As such, we would expect that for a given terrain and propagation model, if we were to measure the path loss between two points which are a certain distance apart we would have a distribution with a Mean Path Loss which is equal to that predicted by the Model, and we would have a normal distribution where 99% of points are within +/−3 Standard Deviations of the Log Normal Shadowing parameter. If the Log Normal shadowing had a standard deviation of 9 dB, we would expect that 99% of point would be within the Mean+/−27 dB. As such, for NLOS radio links, even for equal distances we can expect to see a lot of variability in terms of path loss. This is not the case for LOS radio links where the path loss as a function of distance is very predicable and can be calculated using the Friis transmission equation. As such, for NLOS backhaul links, a network or system which can account for a large amount of variability in path loss would be very beneficial.

Antenna directivity is also a major difference between a typical LOS radio link at microwave frequencies versus a NLOS radio link at lower RF frequencies. For LOS radio links at higher frequencies, the antennas can be very directional and as a result the probability of receiving co-channel interference from another LOS radio link is very small. For NLOS radio links, lower frequencies are typically used and, as such, an equally sized antenna would be less directional, which would result in a broader beam in the azimuth plane. Furthermore, given the random nature of obstructions in a NLOS environment, beam spreading can be expected. As such, the probability of being exposed to co-channel interference is much greater than for a LOS system where the antenna beam patterns are much narrower. There is therefore a need to coordinate the many NLOS radio links which are sharing the same channel frequency in a given geographic location if we are to be able to control the Carrier to Interference and Noise Ratio (CINR) which a given radio link experiences.

Given the difficulty of predicting the mutual interference between multiple links, the fact that it may change with time, embodiments of the present invention therefore provide a system and method for measuring the co-channel interference, (which may be referred to as relative interference, mutual interference or interlink interference, for example), which is created by every Hub to every Remote Backhaul Module in a given network, and determining the relative Interference which is created by every Remote Backhaul Module to every Hub. Advantageously, these co-channel interference metrics are used as the basis for intelligently managing resources to substantially reduce or minimize interference and/or increase or maximize the grid capacity of a NLOS backhaul network.

For example, systems and methods of preferred embodiments provide for grouping of interfering and/or non-interfering links, and managing resource block allocations accordingly, i.e. assigning common resource blocks preferentially to, or only to, weakly interfering links or groups of links, and allocating different resource blocks or orthogonal channels to strongly interfering links or groups of links, to increase the CINR sufficiently to allow for high performance modulation. If required, the same resource blocks may be used when a link is at maximum capacity, but the expectation is that links will rarely go to maximum capacity.

When multiple antennas are used for transmission and reception, the path loss will be measured separately for each antenna. When polarization diversity is used, large variations in the level of interference can result even if the two transmitting antennas are co-located.

Before describing in more detail systems and methods according to preferred embodiments, by way of explanation of the proposed methodology, results are presented for simulations of co-channel interference comprising interlink interference in an exemplary network such as shown in FIG. 1.

To simulate co-channel interference, in this analysis, we assume that the antennas of the Hub and Remote Backhaul modules are directional and have a 3 dB beam width of 60 degrees and 15 degrees respectively. In order to minimize the number of co-linear links we have arranged the grid such that the links alternate from a horizontal/vertical pattern to a diagonal pattern of +/−45 degrees. This arrangement is used to simulate the co-channel interference which results when a sizeable number of NLOS radio links (100 in this simulation) are deployed, such as represented by the grid in FIG. 1.

In a typical wireless deployment where the terminals have Omni-Directional antennas we would expect the transmitters which are closest to our receiver of interest to generate the greatest amount of interference. For a deployment of NLOS Backhaul radio links where the antennas are directional, this is not necessarily the case, as will be illustrated with reference to the simulation results shown in FIG. 2.

Figure 2:
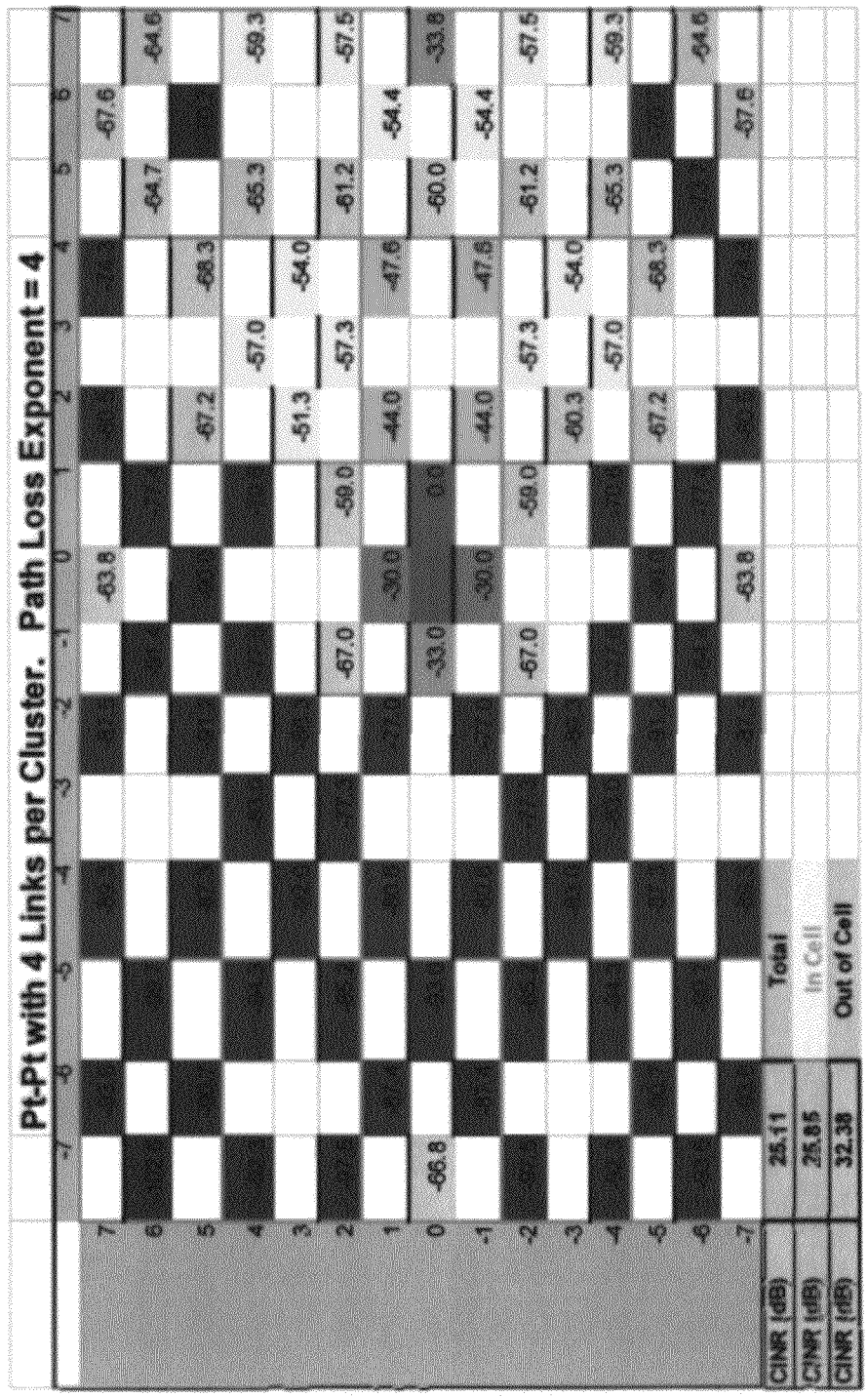
FIG. 2 is a schematic diagram showing the simulated co-channel interference generated by multiple radio links operating at the same frequency; each square represents a Remote Backhaul module and the number in the respective square indicates the relative signal strength which is received by the Hub receiver when that Remote Relay node transmits; the simulation assumes all Remote Relay nodes are transmitting at the same power; the [Green] Center tile (0,0) is the location of the Hub which is receiving a signal from the other [Green] Tile immediately to the right (0,1)

FIG. 2 represents schematically the results of a simulation of the co-channel interference generated by multiple radio links operating at the same frequency. It is a table showing the simulated co-channel interference created by multiple clusters of Radio links; this particular calculation only considers path loss and antenna direction and beam patterns, and it assumes that the path loss between two nodes is directly proportional to the Distance to the Power of the Path Loss exponent ($PL=D^{PLexp}$). Each square represents a Remote Backhaul module and the number in the respective square indicates the relative signal strength which is received by the Hub receiver when that Remote Relay node transmits. The simulation assumes all Remote Relay nodes are transmitting at the same power. Different colours or cross hatching of each tile or square represent ranges of relative signal strength to assist in visualizing ranges of values of relative signal strength.

FIG. 2 represents the relative interference which is being received when each of the Remote Backhaul modules is transmitting. The Hub of interest for which we are calculating the CINR is the center [green] square at coordinates (0, 0). The Remote Relay Node which is transmitting the desired signal is in the [green] tile immediately to the right, at coordinates (1, 0). The largest amount of interference is being generated by the Remote Backhaul modules which are in the same cluster as the link of interest. The two links immediately above and below the desired link are contributing an interference level which is −30 dBc compared to the desired signal. Given that the 4 remote backhaul modules within the same cluster are all under the control of the hub, the power control algorithms will cause all four signals to arrive at approximately the same power, at the hub of interest, for a given modulation. If we allow all four links to transmit simultaneously on the same frequency and time slot, the majority of protection from co-channel interference is provided by the directional antennas and their ability to preferentially receive the signal from the direction of interest and to reject the interfering signal at +90, 180 and 270 degrees. In this analysis we assumed the side lobe levels of the Hub antenna at +90 and −90 degrees was 30 dB while the front to back ratio of the antenna was 33 dB. Given that the links from the 4 Remote Backhaul modules within the same cluster would all be under Power Management, they would all arrive at roughly the same power (for a given modulation level) and the amount of interference received is directly proportional to the level of the antenna side lobes in the direction of the interfering signal. In the discussion above, we assume that we are considering the Up Link signal which is being transmitted from the Remote Backhaul Module to the Hub, but the same considerations apply to the Down Link analysis when the Hub transmits to the Remote Backhaul Module.

When calculating the interference contribution from Remote Backhaul Modules outside of the cluster of interest, we must now consider a few other parameters. A first parameter is the Path Loss between the two nodes. A second parameter is the antenna gain of the Hub in the direction of the interfering node in question. A third parameter is the antenna gain of the Remote Backhaul module in the direction of the Hub. A fourth parameter is the amount of Power which is being transmitted by the interfering node. In general, a Remote Backhaul module will need to transmit at a higher power if it is further from the hub module, or there is a larger amount of path loss between it and the hub module to which it is trying to send data. In this initial analysis we assume that the terrain is isotropic and the path loss between two nodes is purely a function of the distance between the two nodes, and the path loss exponent. In this analysis we have assume a path loss exponent of 4. Given that the Hub antenna is pointing directly to the right, we would expect that most of the interference would come from Remote Backhaul modules to the right of the Hub of interest. Furthermore, given that the Remote Backhaul Modules will have antennas which are pointing towards the center of their own cluster, we would expect those modules whose antenna is also pointing toward the Hub of interest to be generating more interference. This is plainly seen by observing that the fourth largest interference contribution comes from a Remote Backhaul module at coordinates (0, 7). Although this is geographically the furthest node, its antenna is co-linear with the link we are analyzing. As a result we do not benefit from any spatial rejection provided by the filters. The benefit is purely a function of the distance. Given that coordinate (0, 7) is 7 times further than the node coordinate (0, 1) from which we are receiving the signal of interest, and that the path loss exponent in the analysis is 4, we would expect the relative signal strength to be $1/7^4=0.0042$ or −33.4 dB.

A node which is closer, for example, the node at (0, 5), actually contributes much less interference −60 dBc. Although the path loss is less, $1/5^4=0.0016$ or −28 dB, the antenna is pointing away from the Hub of interest. As a result, the amount of energy being radiated towards the Hub of Interest is 32 dB lower than in the direction of peak antenna gain. Consequently, the interference received by the Hub of interest is −28−32=−60 dBc.

If we move even closer to the Hub of interest, to Remote Backhaul module at location (−2,−1), we see that the node contributes an interference level of −67 dBc despite its relative nearness. In this case the distance between the two nodes is $(2^2+1^1)^2=2.236$, and as such the relative path loss should be $1/(2.234)=0.04=-14$ dB, assuming an isotropic environment with a path loss exponent of 4. Despite this relatively small relative path loss, we benefit from the spatial rejection of both the Hub and Remote Backhaul module antennas. From the perspective of the Hub antenna, the Remote Backhaul Module is at an orientation of 116 degrees and the antenna provides a spatial rejection of −30 dB. From the perspective of the Remote Backhaul Module antenna, the Hub of interest is at an orientation of 71 degrees and the antenna provides a spatial rejection of −23 dB. As a result of the path loss and the directivity of each antenna, the relative strength of the interfering signal is −14−23−30=−67 dBc. In this analysis, the distance provides a reduction of 14 dB, while the directivity of the two antennas provides a reduction 53 dB, in the strength of the interfering signal. Despite being considerably closer than the node at (0, 7) the interference contribution is actually 33.6 dB lower.

This simulation highlights that, for deployment where directional antennas are used, orientation is a more important consideration than distance when determining the relative strength of the co-channel interference.

From FIG. 2, when we sum the power of the interfering signals from all nodes, we have a total Interference Power of −25.11 dBc relative to the signal of interest. The contribution from nodes inside of the Hub's own cluster is 25.85 dB while the contribution from nodes outside of the Cluster is 32.28 dB. The majority of the interfering energy from outside of the cluster comes from the node at (0, 7) which contributes −33.8 dBc all by itself.

Figure 3:
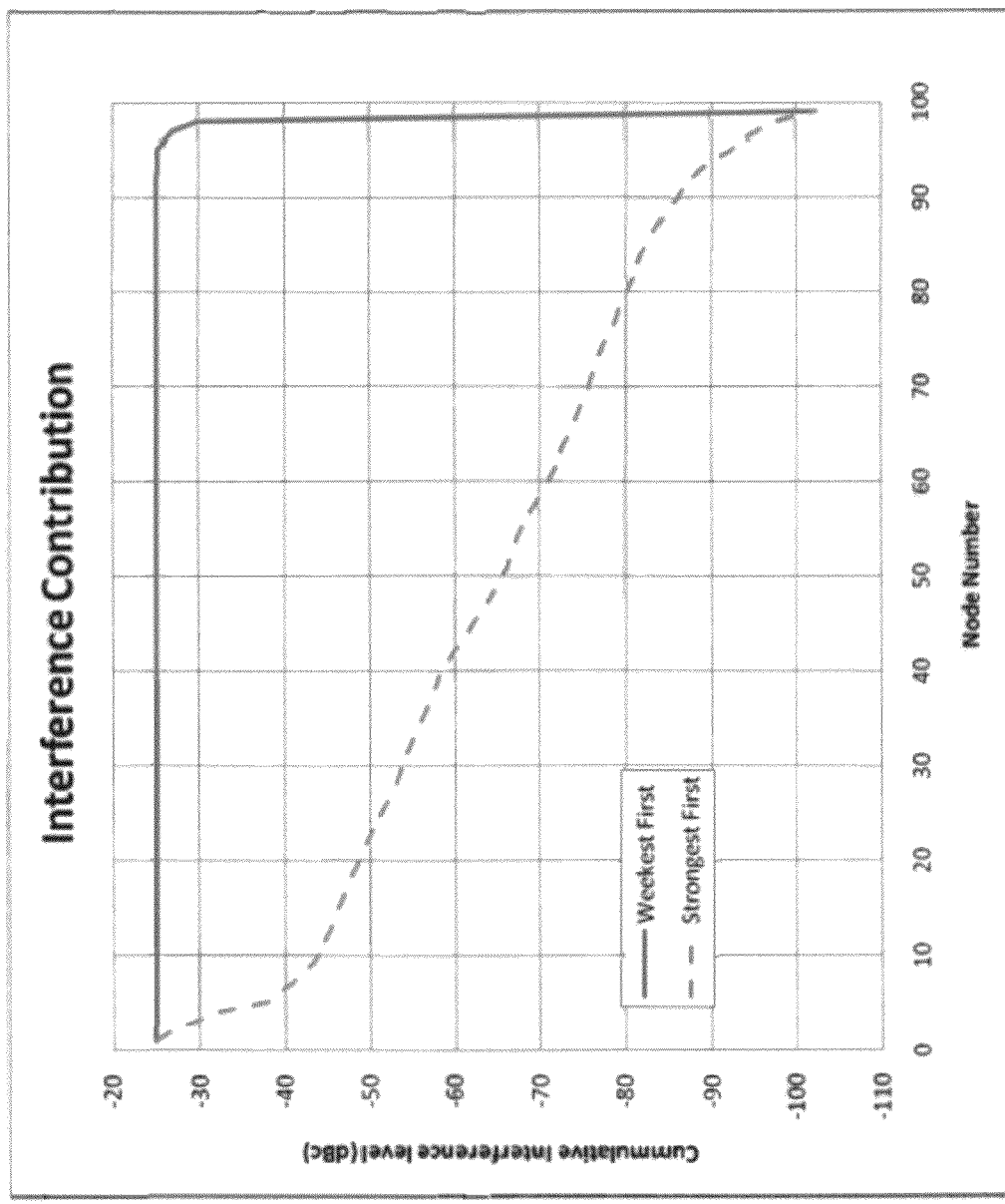
FIG. 3 shows a graph representing Cumulative Interference level as nodes are removed from the scheduling slot; the solid line [red] shows the total co-channel interfering signals as the weakest nodes are removed first, while the dotted line [green] shows the total co-channel interfering power level as the strongest interferers are removed first.

FIG. 3 shows a graph representing the Cumulative Power of all the interfering signals as we remove nodes. The solid curve [red] starts with a cumulative interference level of −25.11 dBc when all nodes are transmitting simultaneously. As we move to the right, we gradually remove one node at a time, starting with the node which contributes the weakest amount of interference and then the node which contributes the next weakest amount of interference and so on and so forth. What we observe is that the CIR is relatively flat, and there is initially very little benefit to removing nodes. This continues to be true until we get to about Node 95, at which point the Interference Signal starts to drop sharply.

The dotted curve [green] also starts with a cumulative interference level of −25.11 dBc when all Nodes are transmitting simultaneously. As we move to the right, we gradually remove one node at a time, starting with the node which contributes the strongest amount of interference and then the node which contributes the next strongest amount of interference and so on and so forth. What we observe is that the cumulative interference level drops sharply from a level of −25.11 dBc to −40 dBc after we remove the first 6 nodes. By removing only 6 of the total of 100 nodes in the grid, we have effectively reduced the total co-channel interfering power by 15 dB. This is a very significant improvement in CINR, since it takes us from a level where high performance modulations such as 256 QAM would be impractical, to an area of comfort. As we continue to remove nodes that interference power continues to drop, but given the inherent distortion in the radio, having the co-channel interference level drop below say −50 dBc or lower does not provide significant benefit.

Figure 4:
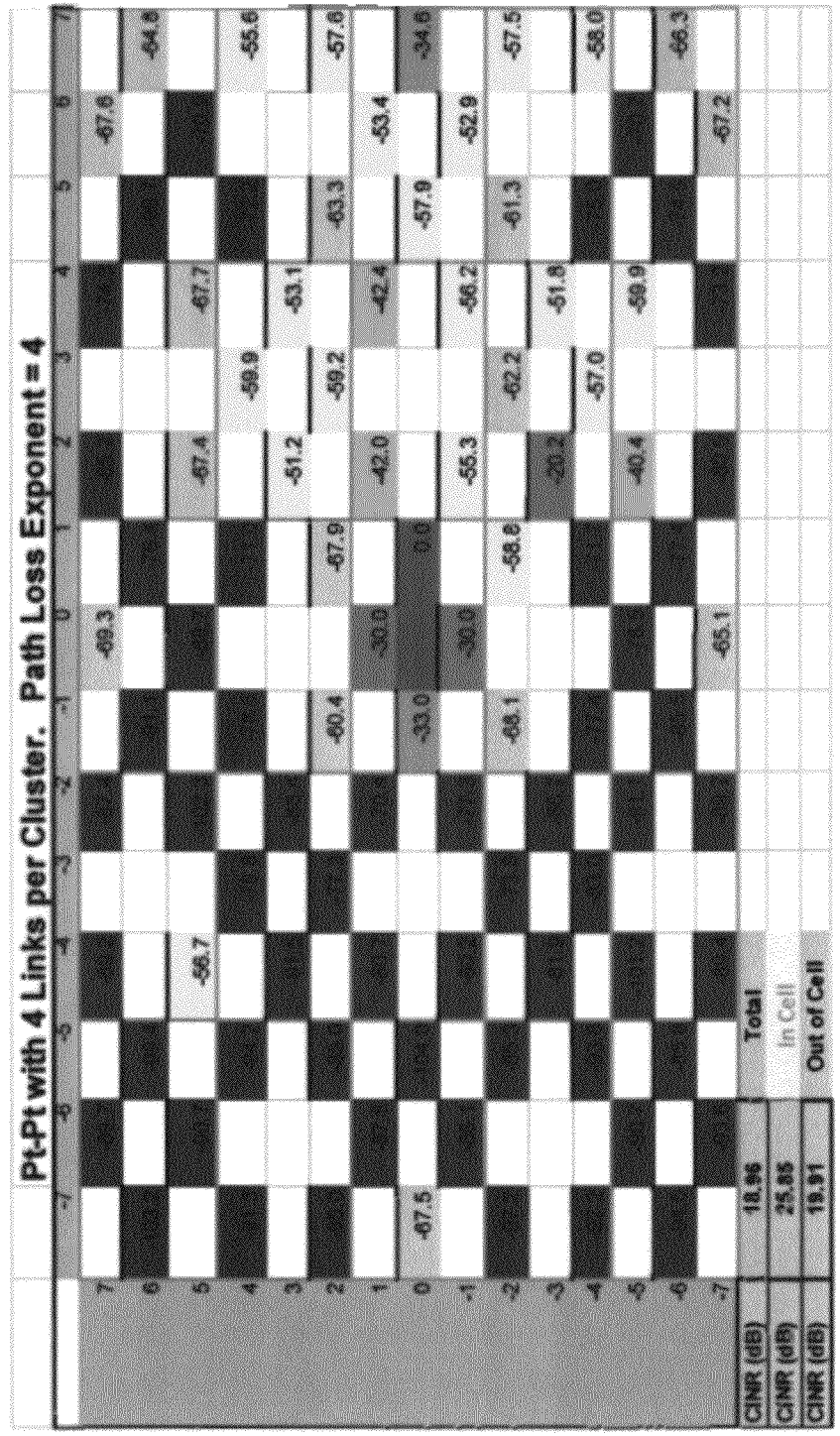
FIG. 4 shows schematically the Relative Interference Power received from each node as a function of distance, antenna orientation and Log Normal Shadowing.

Another factor that contributes to CINR is the Random effect of Shadowing. FIG. 4 shows the Relative Interference Power received from each node including a random element known as Log Normal Shadowing, in addition to the previously considered parameters of distance, antenna orientation and path exponent included in the simulation shown in FIG. 3.

Log Normal Shadowing accounts for random elements in the environment which cause the path loss between two points to increase or decrease compared to that predicted by the NLOS propagation model. In this particular scenario we assumed that the Log Normal Shadowing had a standard deviation of 8 dB. We further assumed that there is no correlation between the nodes since they are sufficiently far apart. Although the grid, antenna orientations and path loss exponent are identical to the scenario depicted by FIG. 2, we find that when we include Log Normal Shadowing the random effects of the environment can significantly change the relative importance of the various nodes in terms of their contribution to interference.

In the simulation including Log Normal Shadowing, the strongest interference is now coming from the node at (−3, 2) with a contribution of −20.2 dBc relative to the signal of interest. Previously, this node contributed −60.3 dBc of interference. The significant increase in power can be due to two factors. The first is that the path loss between this node and its hubs could be larger than previous as a result of obstructions or a more lossy propagation path, which would force the node to transmit at a higher power to sustain a desired modulation level. The second factor can be that the path loss between it, and the Hub of interest, could be lower, again as a result of a more favourable propagation environment between these two nodes. Potentially, the increase interference power could be a combination of both of these factors. In the extreme, we could potentially have a Line of Sight between the two antennas which would result in significantly less path loss. The end result is that the interference received from this node is now about 40 dB higher than when we assume an isotropic environment. The total interference received by the Hub of interest is now −19 dBc compared to the previous value of −25.1 dBc.

Figure 5:
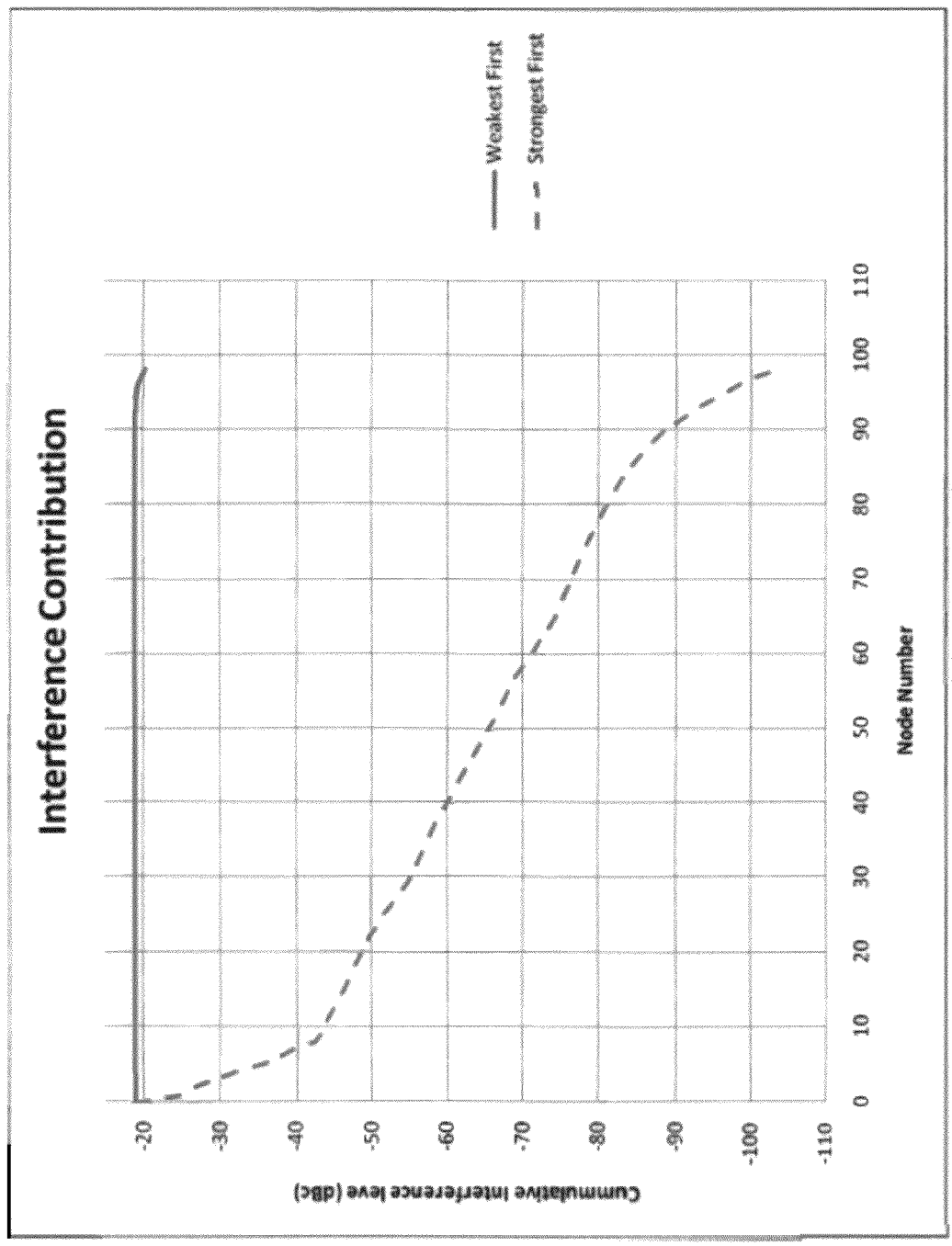
FIG. 5 shows a graph representing Cumulative Interference level as nodes are removed from the scheduling slot; the solid [red] line shows the total co-channel interfering signals as the weakest nodes are removed first, while the dotted [green] line shows the total co-channel interfering power level as the strongest interferers are removed first.

FIG. 5 shows a graph representing the Cumulative Interference level as nodes are removed from the scheduling slot. Solid (red) shows the total Co-channel interfering signals as the weakest nodes are removed first, while the dotted [green] line shows the total co-channel interfering power level as the strongest interferers are removed first. Again we compute the total Co-channel interference power as nodes are removed from the scheduling slot in question. In a fashion identical to FIG. 3, the [red] solid curve assumes that the nodes which have the smallest contribution to total interference power are removed first while the dotted [green] line assumes that the nodes which have the strongest contribution to total interference power are removed first. After we have included the random effects of Shadowing, the conclusions remain the same. So long as the strongest interferers are using the same resource block, the interference power remains very strong and the available CIR is quite small. Conversely, if we remove the strongest interferers first, the CIR quickly improves from 19 dB to better than 40 dB after removing only 6 nodes. A CIR of 19 dB is inadequate since we need a minimum CINR of 25 dB in order to sustain a desired modulation of 256 QAM with 6/8 Encoding. On the other hand, after removing a few of the strongest interferers, a CIR of 40 dB is very good since it is more than enough to support the most spectrally efficient modulations which are typically used for wireless communication, such as 256 QAM or potentially even 512QAM or 1024 QAM.

In summary, based on the preceding analysis, we have found that the amount of interference between two nodes is:
- strongly dependent on the relative orientation of the antennas.
- somewhat dependent on the relative distance of the links, but when directional antennas are used, the antenna orientation is usually a more important factor than distance.
- strongly dependent on Log Normal Shadowing, which is a random element attributed to the environment (buildings, trees, hills, et al.)
  - Shadowing will change from one deployment to the next and is difficult to predict without sophisticated and time consuming modeling of the local terrain
  - Shadowing may change with the seasons and over time as new buildings are erected or demolished and as trees grow or are cut down.

In view of the challenges of accurately modeling and simulating co-channel interference for real networks, particularly the contribution of Log Normal Shadowing effects, it is desirable to have a practical system and method for periodically measuring co-channel interference.

As will be apparent from the simulation results shown in FIGS. 3 and 5, removing only a few strongly interfering links can significantly improve the CINR to a level that allows for high performance modulation schemes to be used. Thus, measurement of co-channel interference to determine which Nodes in a grid contribute the most interference to a link of interest and to identify Nodes that contribute low interference provides the basis for intelligent management of resource blocks. In particular, resources may then be managed in such as way that the same resource blocks are not allocated to links which are known to interfere strongly with each other. Thus links that interfere most strongly may be separated, and allocated different resource blocks from links that interfere less strongly. For example, groups of weakly interfering links may be allocated to the same channel, while most strongly interfering links may receive orthogonal channel allocations, so as to reduce interference and maximize CINR.

In a fixed deployment where the orientation and position of the nodes does not change, the measurement of co-channel interference would only need to be performed periodically to determine which nodes contribute most interference. Shadowing may change periodically, for example, with the seasons as the leaves on trees come and go, or potentially as new buildings are erected, but it should not change significantly on a second by second basis.

Given the difficulty of predicting the mutual interference or interlink interference between multiple links, the fact that it may change with time, embodiments of the present invention therefore provide a system and method for measuring the relative Interference which is created by every Hub to every Remote Backhaul Module in a given network, and determining the relative Interference which is created by every Remote Backhaul Module to every Hub. Advantageously, these measurements of co-channel interference, comprising its interlink interference, are used as the basis for intelligently managing resources to substantially reduce or minimize interference and increase or maximize the grid capacity of a NLOS backhaul network.

Measurement of Co-Channel Interference:

A method according to a preferred embodiment comprises: measuring co-channel interference comprising interlink interference for each link and allocating resources based on co-channel interference data/metrics to reduce interference and/or increase cell capacity.

Preferably, measurement of co-channel interference comprises: measuring the relative path loss between each of two or more links, and determining the resultant co-channel interference that they will create for each other. For example, the method may include identifying links that strongly interfere with each other (i.e. above a certain threshold interference level) or identifying a group of the most strongly interfering links; and/or—identifying links that do not strongly interfere with each other (i.e. below a threshold interference level), or identifying groups of links that collectively have a CINR below a threshold level; and organizing links into groups which do not interfere strongly, or do interfere strongly with each other.

Preferably this information on co-channel interference is used for scheduling resources, i.e. a resource block comprising a sub-carrier or a group of sub-carriers, together a time slot or a group of time slots in a frame, such that groups of nodes that interfere strongly are allocated different resource blocks.

A system according to a preferred embodiment, for managing adaptive resource allocation (MARA) in a wireless backhaul network comprises a plurality of nodes, each node comprising a cluster of a Hub and/or at least one Remote Backhaul Module, and comprises a processor or distributed processor means, i.e. hardware and or software, for performing the steps of: determining co-channel interference by measuring the relative path loss or signal strength between each of two or more links, and determining the resultant co-channel interference that they will create for each other; identifying, grouping, or otherwise organizing links based on the co-channel interference data/metrics; and a scheduler for allocating resources based on co-channel interference data/metrics and link groupings. In a preferred embodiment, a central node, or control node, controls the process.

Measurement of co-channel interference data may include identifying links that strongly interfere with each other (i.e. above a certain threshold interference level) and/or identifying links that do not strongly interfere with each other (below a threshold interference level) and determining a CINR for groups of links.

Beneficially the scheduler allocates links that interfere most strongly, or exceed a threshold level to different resource blocks. Links that do not interfere strongly, or below a threshold interference level, may be allocated to the same resource blocks.

Preferably the scheduler minimizes the likelihood that links which have been determined to interfere strongly with each other are allocated to the same resource block. More particularly, the method comprises measuring the mutual interference between each node, periodically, while the network is in active service.

Measuring the Mutual Interference Between Links:

The network of NLOS backhaul modules must be able to measure the Mutual Interference (co-channel interference) generated by every node while the network is in active service. It is desirable to repeat this measurement periodically, and, for example whenever a new node is brought into service, or modified or removed from service, or when there are significant environmental or seasonal changes.

In a preferred embodiment, the measurements of Downlink and Uplink Co-channel Interference are performed as will now be described.

Down Link Interference Characterization:

An OFDM resource block, in the Downlink Frame, is identified and reserved, across multiple nodes, to perform the measurement, for a predetermined period. Once the measurement is complete the dedicated resource block is released and it can then be used by the system to transmit data. The resource block is reserved across multiple nodes, preferably the entire WAN or MAN, to improve the dynamic range of the measurement. (That is, the reserved, predetermined, resource block is not being reused by any nearby cells during measurement).

A resource block comprises of a sub-carrier or group of sub-carriers as well as a predetermined time slot or group of time slots in the frame The resource block is made known to every Node, Hub or Remote Backhaul module, which participates in the measurement.

A selected Hub Node, in a predetermined sequence of each Hub Node from the group transmits a pre-determined symbol, at a predetermined power level, in the pre-determined resource block.

All other Hub nodes in the vicinity of the measurement area will not use this resource block to transmit Downlink information, and leave it empty to ensure that the only node transmitting a symbol in this resource block is the node for which a measurement of the interference contribution is being made.

All Remote Backhaul Modules will demodulate the "Predetermined Downlink Symbol" and measure its amplitude and phase. The amplitude of the received symbol is directly proportional to the relative interference contribution of that Hub Node to the receiving Backhaul Module Node.

In the next frame, the next Hub Node in the predetermined sequence will use the reserved resource block to transmit the Predetermined Symbol, while all Remote Backhaul Nodes demodulate the desired symbol and measure its relative interference contribution.

The process continues until all Hub Nodes have, one at a time, had a turn to transmit the predetermined symbol in the predetermined resource block, and all Remote Backhaul Nodes have demodulated and stored the relative magnitude received from each Hub Node.

Up Link Interference Characterization:

Similarly, UpLink Interference characterization is performed as follows:

An OFDM resource block, in the Uplink Frame, is identified and reserved to perform the measurement.

A resource block comprises of a sub-carrier or group of sub-carriers as well as a predetermined time slot or group of time slots in the frame The resource block is made known to every Node, Hub or Remote Backhaul module, which will participate in the measurement.

A selected Remote Backhaul Module, in a predetermined sequence of each Remote Backhaul Module from the group will transmit a pre-determined symbol, at a pre-determined power level, in the pre-determined resource blocks.

All other Remote Backhaul Modules in the vicinity of the measurement area will not use this resource block to transmit Uplink information, and leave it empty to ensure that the only node transmitting a symbol in this resource block is the node for which a measurement of the interference contribution is being made.

All Hub Nodes will demodulate the "Predetermined Up Link Symbol" and measure its amplitude and phase. The amplitude of the received symbol is directly proportional to the relative interference contribution of that Remote Backhaul Module to the receiving Hub Node.

In the next frame, in turn, the next Remote Backhaul Module in the predetermined sequence will use the Reserved resource block to transmit the Predetermined Symbol, while all Hub Nodes demodulate the desired symbol and measure its relative interference contribution.

The process continues until all Remote Backhaul Modules have, one at a time, had a turn to Transmit the predetermined symbol in the predetermined resource block, and all Hub Nodes have demodulated and stored the relative magnitude received from each Remote Backhaul Module.

Once the measurement is complete, the Signal Strength Information that was measured by every module, is shared and disseminated to all the other modules, or alternatively to a central device.

Each Remote Backhaul Module provides the data, or receives the data, to or from its respective Hub using the over the air OA&M, communication protocol. The Hubs may communicate amongst themselves, or with a central device, using the Ethernet and IP protocols. All the modules in the managed network, or managed zone of the network, have knowledge of the magnitude of the mutual interference between all the Hub and Remote Backhaul modules. The information can be presented in matrix form (MARA matrix), as illustrated in FIG. 6, displaying the magnitude of interference received or created between each Hub and Remote Backhaul Module pair $Hub_a/RBM_b$ for every Hub ($Hub_1$ to $Hub_u$) and every Remote Backhaul Module ($RBM_1$ to $RBM_m$) in the managed network. Every column lists the relative interference that a given Hub receives from each of the Remote Backhaul Modules within the zone of interest. Every row lists the relative interference level that a given Remote Backhaul Module receives from each Hub in the managed zone.

Given that all Remote Backhaul Modules or Hub modules transmitted the predetermined symbol at a known power, ideally the same power, the path loss between every Hub and every Remote Backhaul module can now be determined with a high level of precision and this knowledge can be used to group the nodes into groups or families which do not interfere strongly with each other and all modules in this group or family would be allocated the same resource blocks since it has been determined that their mutual interference is insignificant. Nodes which have been determined to interfere strongly with each other, on the other hand, would only be allocated similar resource blocks when one of the nodes is being asked to generate maximum capacity. When the node is not fully loaded and only needs to use a sub-set of the available resource blocks, it would not be allocated resource blocks which have been preferentially assigned to the other nodes with which it is known to interfere. In this way, the overall interference can be reduced, preferably kept to a minimum, and the capacity of a dense grid of NLOS radio links can be increased, preferably maximized.

In a system according to an exemplary embodiment, which will support modulations as high as 256 QAM with 7/8 encoding, it is desired to have a CINR of at least a predetermined threshold, e.g. 30 dB, to reliably support this level of modulations. As such, any node which contributes interference at a level higher than this level, i.e. −30 dBc relative to the power level of the desired signal, can prevent the desired link from sustaining the desired data rates, when it alone is transmitting at full power. A weaker interferer which generates an interference level of about −40 dBc is less of a concern, but ten such modules all transmitting together, which each individually contribute −40 dBc of interference, could cause the desired CINR to drop below 30 dB and as such for a dense grid this level of interference from a set of more weakly interfering modules still needs to be considered a part of a strongly interfering group. That is the cumulative interference of a set/group/number of modules is another parameter that may be used to determine a cumulative threshold level for mutual interference in a group of a plurality modules. Modules which contribute an interference level of say −50 dBc or less are probably not an issue for most deployments since it would take 100 modules, each contributing an interference level of −50 dBc to degrade the CINR to less than 30 dB Measurement Dynamic Range:

The required or expected dynamic range of measurements may present a particular challenge. The strongest signal, usually the desired signal, will have a relative strength of say 0 dBc. When it is desired to have the cumulative interference power be at −30 dBc or lower relative to the desired signal, given that low levels of interference are received from many nodes, to achieve this level of aggregate interference power, it is preferable that interference measurements can be made as far down as −50 dBc relative to the desired signal. This requires the system to be able to measure across a fairly large dynamic range.

Intermodulation products from the more powerful transmitters may mask a weak signal arriving from the node whose interference contribution we are trying to measure. For example, the received signal power of the desired signal is being received at 0 dBc. Although this node is not transmitting any symbols in the "reserved resource block" the transmitter will have a finite linearity and will be generating third order intermodulation products. For a lower power unlinearized transmitter, the third order intermodulation products may be on the order of −30 dBc relative to the signal being transmitted. This would cause noise to be transmitted in the frequency bins which had been reserved for the measurement. The symbol received from any nodes which have a contribution of less than −30 dBc would fall below the third order intermodulation products being generated by the transmitter of the signal we are trying to receive from.

There are several approaches that may be used to reduce this signal. The first is that the transmitter in the cluster of the node which is trying to receive the weak signal from the node of interest can be made to cease transmitting for one symbol, during which the very weak signal can be received. Second approach is that the "Predetermined Symbol" can be power boosted relative to the average power of the carrier the node in question is transmitting. A third is that some "Processing Gain" can be incorporated in the "predetermined symbol" to allow it to be received and measured even if it falls below interference as the same frequency or the noise floor of the receiver. Incorporating processing gain requires more time or bandwidth to be allocated to the measurement.

Another limitation can be the noise floor of the receiver in question. Assuming that the signal of interest is at 0 dBc, the noise floor may be at −40 dBc or even −35 dBc, which is still sufficiently low to allow a CINR of 30 dB. In this scenario, a symbol being received by a node with an interference contribution of −50 dBc could be as much as 15 dB below thermal noise of the receiver. In this scenario the interference contribution of this node cannot be easily measured. Once again, the predetermined symbol can be power boosted by a few dB. Alternatively, processing gain can be incorporated.

Processing gain can be incorporated by transmitting several symbols in sequence, with a known pattern. This method allows for use of a relatively small amount of bandwidth, but a longer measurement period is required. If 20 dB of processing gain was required, 100 symbols could be transmitted, with a known pattern. In a TDD system where we allocate 1 symbol per 5 msec frame, it would require 100 frames or 0.5 seconds to complete the measurement for a single node. Alternatively, if 10 symbols per frame were used, it would require 10 frames or 50 msec to complete the measurement for a single node.

A preferred implementation uses a combination of power boosting and processing gain to allow a greater measurement dynamic range.

Embodiments of the present invention as described above provide systems and methods for Managed Adaptive Resource Allocation (MARA) which allow for resources to be allocated based on periodic measurement of co-channel interference for each link in an active wireless network of Nodes, e.g. comprising Hubs and Remote Backhaul Modules.

Using measured co-channel interference metrics, and based on grouping of links by the magnitude of co-channel interference, e.g. into more strongly or more weakly interfering groups, a scheduler preferentially allocates only weakly interfering links to common channels or resource blocks, and allocates more strongly interfering links to orthogonal channels or resource blocks. Thus resource blocks may be managed to more effectively reduce interference between links and/or increase the aggregate capacity of a plurality of links.

While systems and method according to preferred embodiments are particularly described with respect to NLOS wireless backhaul networks, it will be appreciated that modifications of these embodiments may be applicable to measurement of co-channel or interlink interference other wide area wireless networks.

Measurements can be made over a wide dynamic range, and used for managed adaptive resource allocation in such networks. Since characterization of uplink and downlink interferences are considered separately, disclosed methods are applicable even when downlink and uplink channels do not have good reciprocity.

INDUSTRIAL APPLICABILITY

Systems and methods according to preferred embodiments provide for measuring co-channel interference comprising interlink interference in wide area wireless backhaul networks, with particular application to high capacity wireless backhaul networks. Co-channel interference metrics may be shared with a central node or amongst all receiving nodes to provide an aggregate view of the co-channel interference comprising mutual interference or interlink interference, conveniently in the form of a matrix of co-channel interference metrics for each link. Measurements may be made over a wide dynamic range. The co-channel interference metrics may be used for managed adaptive resource allocation as described herein, and particularly for management of resource allocation for Non Line of Sight (NLOS) wireless backhaul in MicroCell and PicoCell networks, e.g. to increase CINR and/or network capacity.

A new Non Line of Sight (NLOS) wireless backhaul solution is provided, which is capable of providing a cost effective, high capacity, backhaul connection from a small cell (MicroCell or PicoCell) Base Transceiver Station. An NLOS backhaul link can provide a high capacity link from a BTS back to a common aggregation point such as an existing cellular tower, where a high capacity fiber link such as 100BT, GigE, OC48 or OC192 is available. An important advantage is that the BTS and/or associated Remote Backhaul Unit do not need to be above clutter, which would be an essential requirement to implement a LOS radio link. Such a deployment model provides a more cost effective solution that overcomes or reduces both the backhaul challenge as well as the site availability issues, and would provide an operator with a high capacity network and much improved DownLink and Uplink speeds for the end user.

Although embodiments of the invention have been described and illustrated in detail, it is to be clearly understood that the same is by way of illustration and example only and not to be taken by way of limitation, the scope of the present invention being limited only by the appended claims.

The invention claimed is:

1. A method for managing resource allocation for a plurality of backhaul radio links in a wireless backhaul network comprising a plurality of stationary nodes, each comprising a transmitter, receiver and directional antenna, the method comprising the steps of:

measuring periodically, at each node, co-channel interference comprising interlink interference from each of the other nodes of the backhaul network, comprising: transmitting, from each node in turn, a signal and measuring a respective received signal at each of the other nodes of the backhaul network to provide measured data, comprising at least one of relative path loss and signal strength, indicative of interlink interference, for each of the plurality of backhaul radio links;

sharing interlink interference data with a central node and/or amongst receiving nodes, to provide an aggregate view of the interlink interference between each link;

determining from said measured data the magnitude of interlink interference for each of the plurality of backhaul radio links and identifying one or more most strongly interfering links of the plurality of backhaul radio links; and scheduling resources comprising allocating a different resource block to each of the one or more most strongly interfering links based on said co-channel interference data to provide at least one of reduced cumulative interference and increased aggregate capacity of the plurality of backhaul radio links.

2. A method according to claim 1, wherein each node comprises a Hub having a high capacity backhaul connection and at least one Remote Backhaul Module, each of the plurality of backhaul radio links provides wireless backhaul connectivity between a respective hub and a remote base station, comprising:

determining from said measured data the magnitude of interlink interference for each of the plurality of Uplink and/or Downlink backhaul radio links between each Hub and each Remote Backhaul Module.

3. A method according to claim 2, further comprising grouping links based on the magnitude of interlink interference, and wherein scheduling resources comprises allocating resource blocks based on said grouping of links.

4. A method according to claim 3, wherein
grouping links based on the magnitude of interlink interference comprises identifying a group of links with low interference below a predetermined threshold, and
wherein scheduling resources comprises allocating common resource blocks preferentially to said group of links with low interference.

5. A method according to claim 3, wherein:
grouping links based on the magnitude of interlink interference comprises identifying a group of most strongly interfering links, and
wherein scheduling resources comprises allocating a different resource block to each link of said group of most strongly interfering links, to increase the carrier to interference and noise ratio (CINR) above a threshold for high performance modulation.

6. A method according to claim 3, wherein:
grouping links based on the magnitude of interlink interference comprises: identifying a group of a) most strongly interfering links; or b) links that have an interference level above or below a threshold level; or c) links that collectively have an interference level above or below a threshold level; or d) weakly interfering links; and
wherein scheduling resources comprises:
assigning common resource blocks preferentially to weakly interfering links or groups of links; and/or
allocating a different resource block or an orthogonal channel to each strongly interfering link or group of links, except when a node is requested to operate at maximum capacity.

7. A method according to claim 1, wherein sharing interlink interference data comprises generating a matrix comprising the magnitude of interlink interference for each link and distributing said matrix to each node.

8. A method according to claim 1, wherein measuring relative path loss or signal strength comprises reserving and using a predetermined resource block to measure the relative path loss or signal strength between multiple radio transmitters and multiple radio receivers.

9. A method according to claim 8, wherein measuring path loss comprises transmitting at least one predetermined symbol from each node in a known sequence such that the relative path loss can be determined between each transmitter and multiple receivers in sequence.

10. A method according to claim 9 comprising transmitting a predetermined group of symbols from each node in a known sequence in order to provide sufficient processing gain at the receiving node and allow the magnitude of the predetermined group of symbols to be measured in the presence of interference or noise.

11. A method according to claim 10 comprising, at the transmitting node, power boosting the at least one predetermined symbol or the predetermined group of symbols to allow distant nodes to receive the predetermined symbol above a noise floor or interference floor.

12. A method according to claim 9, wherein measurements of the relative signal strength of the at least one predetermined symbol are shared with a central node or amongst all receiving nodes to provide an aggregate view of the mutual interference between each link.

13. A method according to claim 6, wherein each of the plurality of backhaul radio links provides NLOS wireless backhaul connectivity between a Hub with a high capacity backhaul connection and one or more remote base stations.

14. A method of according to claim 6, comprising performing the steps of determining the magnitude of interlink interference at periodic intervals during active service of the backhaul network.

15. A method according to claim 6 wherein to reach a threshold for high performance modulation, the method comprises providing one or more of a dynamic range of greater than 50 dB, cumulative interference of less than −50 dBc and a Carrier to Interference and Noise Ratio (CINR) of greater than 30 dB and preferably greater than 50 dB.

16. A non-transitory computer readable storage medium storing instructions, which when executed in processor means of a wireless backhaul network, perform the method steps of claim 1.

17. A method for characterizing co-channel interference between a plurality of backhaul radio links in a wireless backhaul network comprising a plurality of stationary nodes, each node comprising a transmitter, receiver and directional antenna, the method comprising:

measuring periodically, at each node, co-channel interference comprising interlink interference from each of the other nodes of the backhaul network comprising:

measuring the relative path loss or signal strength for each of a plurality of radio links comprising reserving a predetermined resource block across multiple nodes, using said predetermined resource block to obtain measurements of the relative path loss or signal strength for each of the plurality of backhaul radio links between said multiple nodes, wherein measuring path loss comprises transmitting at least one predetermined symbol or a predetermined group of symbols from each node in a known sequence such that the relative path loss or signal strength is determined between each transmitter and multiple receivers in sequence;

sharing said measurements of the relative path loss or signal strength of the at least one predetermined symbol, or predetermined group of symbols, with a central node or amongst receiving nodes, comprising generating a matrix comprising the magnitude of co-channel interference comprising interlink interference for each link and distributing said matrix to each node, such that an aggregate view of the co-channel interference comprising interlink interference of each node is known by other nodes;

determining from said measurements a cumulative interference for said plurality of backhaul radio links, and identifying one or more most strongly interfering links of said plurality of backhaul radio links causing the cumulative interference to exceed a threshold cumulative interference.

18. A method according claim 17, comprising transmitting a predetermined group of symbols from each node in a known sequence in order to provide sufficient processing gain at the receiving node and allow the magnitude of the predetermined group of symbols to be measured in the presence of interference or noise.

19. A method according to claim 17 comprising, at the transmitting nodes, power boosting the at least one predetermined symbol or predetermined group of symbols to allow distant nodes to receive the predetermined symbol above a noise floor or interference floor.

20. A method according to claim 17 wherein: during transmission of said at least one predetermined symbol or group of symbols to a receiving node, ceasing transmission from the transmitter of the receiving node for said at least one symbol, during which a weak signal from the transmitting node can be received.

21. A method according to claim 17, wherein the backhaul radio links are used to provide NLOS wireless backhaul connectivity between a Hub with a high capacity backhaul connection and one or more remote base stations.

22. A method according to claim 17 comprising: performing the steps of determining the magnitude of interlink interference at periodic intervals during active service of the backhaul network.

23. A method according to claim 17, comprising characterizing interlink interference with a dynamic range of greater than 50 dB.

* * * * *